May 23, 1933.  G. RAYMOND  1,910,259
WELDING GANTRY
Filed Jan. 11, 1932  6 Sheets-Sheet 2
Fig. 2.
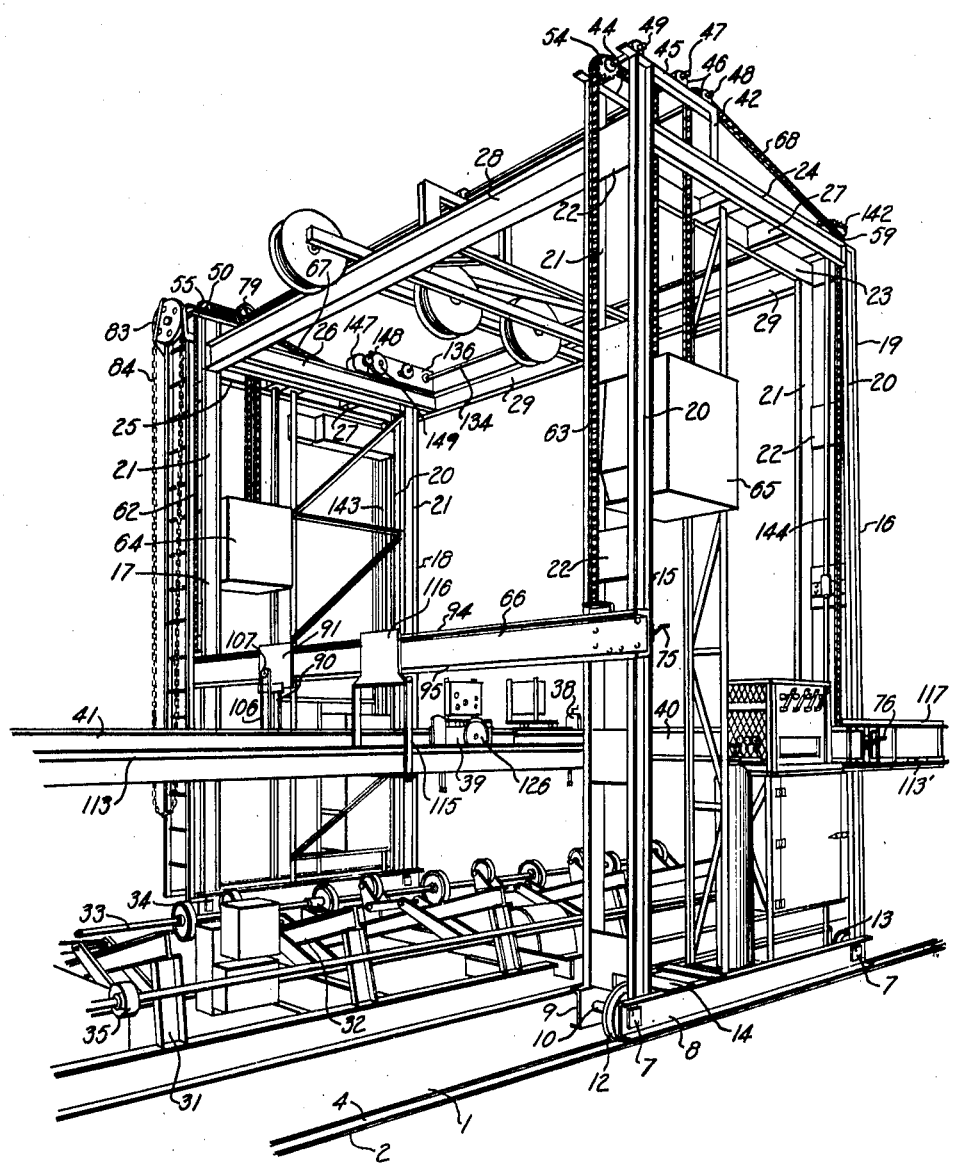
INVENTOR.
Gwynne Raymond.
BY 
ATTORNEY.

May 23, 1933.  G. RAYMOND  1,910,259
WELDING GANTRY
Filed Jan. 11, 1932  6 Sheets-Sheet 4

INVENTOR.
Gwynne Raymond
BY
ATTORNEY.

May 23, 1933.　　　G. RAYMOND　　　1,910,259
WELDING GANTRY
Filed Jan. 11, 1932　　6 Sheets-Sheet 5

INVENTOR.
Gwynne Raymond.
BY
ATTORNEY.

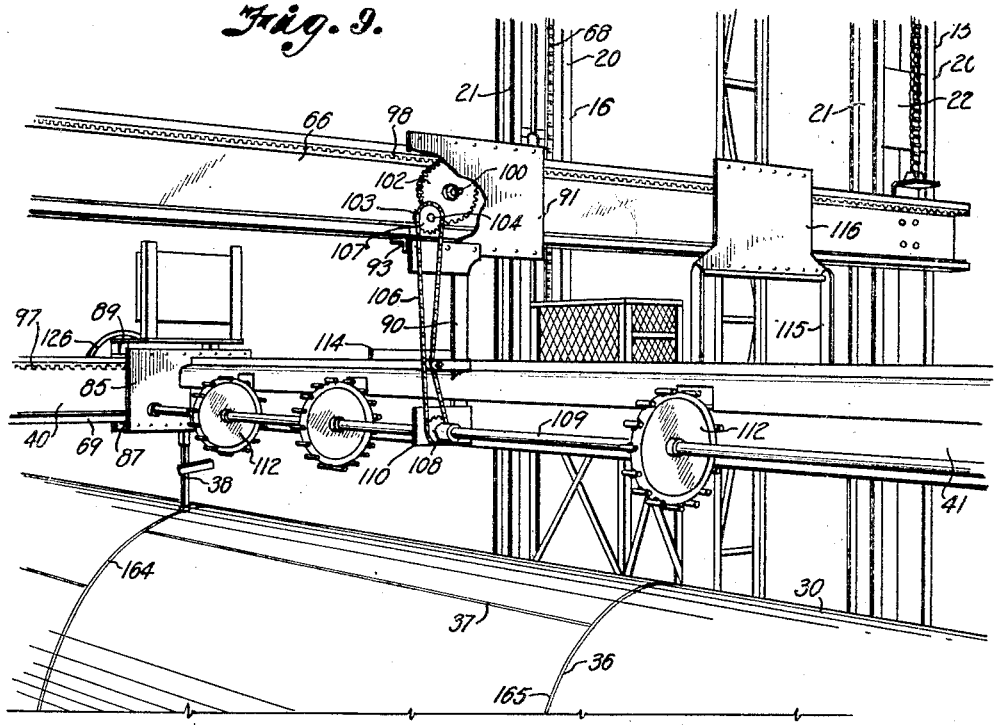
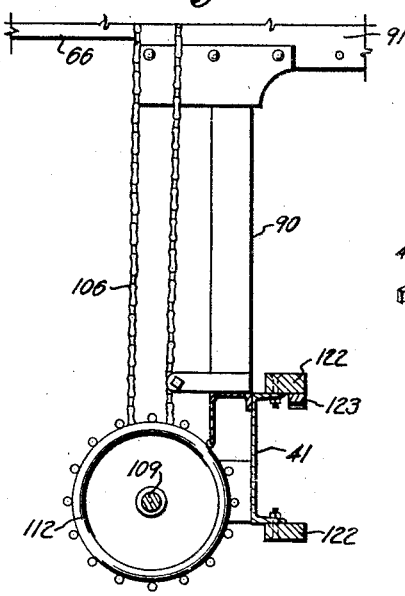
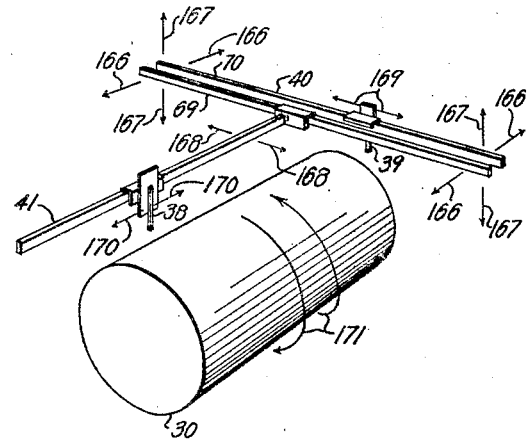

Patented May 23, 1933

1,910,259

UNITED STATES PATENT OFFICE

GWYNNE RAYMOND, OF KANSAS CITY, MISSOURI

WELDING GANTRY

Application filed January 11, 1932. Serial No. 585,909.

This invention relates to welding apparatus and more particularly to a welding gantry, and has for its principal object to automatically weld seams in two or more directions with the same setting of the work piece, for example, in welding cylindrical tanks it is possible to weld both longitudinal and roundabout seams with one setting of the tank.

It is also objects of the invention to provide for simultaneously welding a plurality of parallel seams, to provide high and low speed drives for facilitating positioning of the welding heads, and to provide for welding both internal and external seams.

It is also a very important object of the invention to provide a welding apparatus that may be quickly adjusted without waste of time from a set-up for welding a very small tank to a set-up for welding a much larger tank, or from these set-ups to one for welding flat bulkheads having both longitudinal and transverse seams.

In accomplishing these and other objects of the invention, I have provided improved details of structure, the preferred form of which is illustrated in the accompanying drawings, wherein:

Fig. 2 is a similar view of the gantry viewed from its opposite side.

Fig. 9 is an enlarged perspective view showing the mechanism for adjusting the longitudinal beam to move the welding heads laterally across the work piece.

Fig. 10 is a vertical sectional view of the longitudinal beam-adjusting means below that part illustrated in Fig. 5.

Fig. 11 is a diagrammatic perspective view illustrating the flexibility of the apparatus rendering the various movements of the welding heads relative to a tank.

Fig. 12 is a detail sectional view through the automatic clutch for disconnecting the low speed gearing when the high speed motor is actuating the gantry.

Figure 1:
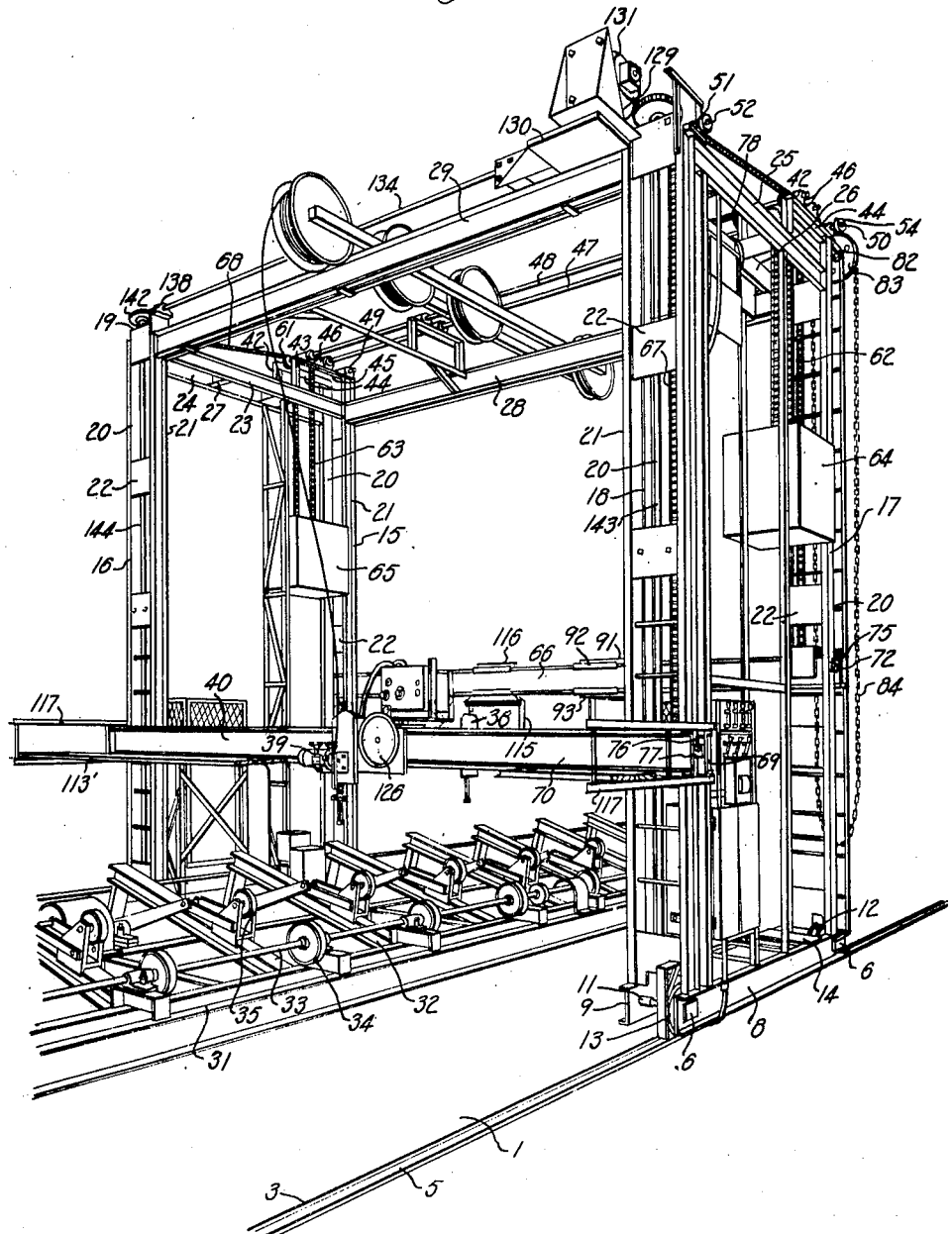
Fig. 1 is a perspective view of a welding gantry constructed in accordance with my invention.

Referring more in detail to the drawings:—

1 designates a floor having spaced, longitudinal, parallel grooves 2—3 spaced apart a distance greater than the width of the maximum work piece with which my apparatus is to be employed. Mounted in the grooves 2—3 are track rails 4—5 having their heads substantially aligning with the upper surface of the floor 1.

Supported on the respective tracks are trucks 6—7, each comprising spaced channels 8—9 carrying axles 10—11 at their respective ends for mounting flanged wheels 12—13 operating on the rails. The channel members are also spaced apart intermediate the axles by suitable cross bars or tie plates 14.

Supported at the ends of the trucks are vertical legs 15—16 and 17—18 of a gantry 19, the legs each comprising spaced, vertical, oppositely facing channels 20—21 connected by spacing plates 22 that are located at suitable intervals along the legs.

The channels forming the legs 15—16 and the legs 17—18, respectively, are connected adjacent their upper ends by spaced, horizontal channels 23—24 and 25—26, which are spaced apart intermediate their ends by suitable tie plates 27. The sets of legs 16—18 and 15—17 are connected adjacent the ends of the horizontal channels by cross channels 28—29 to form a rectangular super-structure for mounting suitable elevating mechanism for welding heads as well as mechanism for moving the gantry along the tracks, as hereinafter described.

The gantry thus described may be shifted longitudinally on the tracks to move over the work, for example, a cylindrical tank designated 30. In the case of welding a tank it is supported on a trunnion member 31 whereby the tank may be rotated to progressively bring the roundabout seams thereof into feeding relation with the welding heads. However, the detail construction of the trunnion forms no part of the present invention, but is illustrated to better define the operation of the gantry. The trunnion illustrated includes a rectangular framework 32 supported on the floor 1 between the tracks and carries a driving shaft 33 having a plurality of rollers 34 cooperating with complementary idler rollers 35 to support the tank therebetween.

The rollers 35 are preferably movable to and from the rollers 34 to accommodate tanks of different diameters in order that the tank may be properly positioned to facilitate frictional driving relation with the driving rollers. The tank illustrated has roundabout seams 36 and longitudinal seams 37 that are adapted to be automatically welded by welding heads movably supported on the gantry by mechanism now described. In welding these seams with facility and speed, it is desirable to equip the gantry with at least two welding heads 38—39 that are quickly adjusted in various directions to the seams of the tank. This is accomplished by mounting the heads on horizontally positioned, transverse and longitudinal beams 40—41 suspendingly supported from the super-structure in guided relation with the legs 15—16 and 17—18, and which are movable thereon by mechanism now described.

The channels forming the legs 15—17 extend above the super-structure and cooperate with vertical angle members 42—43 projecting upwardly from the channels 23—24 and 25—26 to support horizontal members 44—45 carrying bearings 46 at their opposite ends for mounting cross shafts 47—48 extending parallel with the channel 28, and short shafts 49—50 carried on the projecting forward ends of the horizontal members 44—45, respectively. Also supported on the channels 23—24 and 25—26 at the opposite ends thereof are bearings 51 for mounting short shafts 52—53 complementary to the shafts 49—50.

Fixed on the shafts 49—50 are sprockets 54—55, respectively, aligning with sprockets 56—57 on the ends of the shaft 47. Likewise fixed on the shafts 52—53 are sprockets 58—59 aligning with sprockets 60—61 on the ends of the shaft 48. Running over the respective sets of sprockets 54—55 and 57—58 are chains 62—63 having their ends extending downwardly to connect with counter-balanced weights 64—65 operating on the inner side of the legs 15—17 of the gantry and to the ends of a beam 66 extending horizontally across the outer side of the legs 15—17, as best illustrated in Fig. 2. The beam 66 is thus suspended by the chains from the sprockets and counter-balanced with other portions of the movable apparatus by the weights 64—65.

Likewise running over the sets of sprockets 58—59 and 60—61 are chains 67—68, respectively, each having their ends attached to the weights 64—65 and their opposite ends to the horizontal beam 40, previously described, which beam operates below the level of the beam 66.

The beam 40 preferably includes spaced channels 69—70 operating vertically of the opposite side faces of the legs 16—18 and are tied together by plates 71 so that they move in guided relation with the legs. The beam 66 also moves in guided relation with the legs 15 and 17 by means of lateral ears 72 having lugs 73 embracing the inner face of the outer flanges of the channel legs, illustrated in Figs. 5 and 6.

In order that the beam 66 may be anchored to the legs, the ears 72 are provided with threaded screws 74 for engaging against the web portion of the legs, and which are actuated by crank arms 75. The beam 40 may be likewise anchored by similar crank screws 76 threaded in end plates 77 connecting the ends of the channels 69—70 composing the beam 40.

In order that the beams 40 and 66 may be simultaneously moved vertically of the legs, the shafts 47—48 are connected to operate in unison by intermeshing gears 78—79 keyed to the shafts at their ends adjacent to the leg 17.

In order to rotate the shafts, the shaft 47 is provided with a worm gear 80 meshing with a worm 81 on a lateral shaft 82 projecting from the gantry and carrying a sprocket wheel 83 provided with an endless depending chain 84, whereby the chain may be manually operated to rotate the shaft 82, worm 81, worm gear 80, and the shaft 47, which simultaneously moves the shaft 48 in the opposite direction due to the gears 78—79. Rotation of the shafts operates the respective chains connecting the balance weights with the ends of the beams, to move the beams up or down the legs of the gantry, depending on the direction of operation of the chain 84.

The longitudinal beam 41 is adjustably supported from the beams 40 and 66, respectively, in such a manner that it may be moved in lateral directions relative to the tank 30, as now described.

Figure 8:
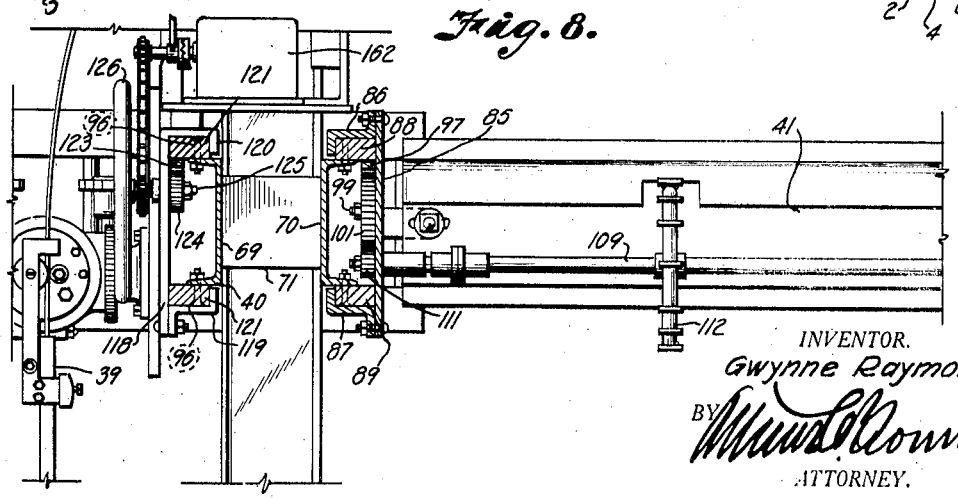
Fig. 8 is an enlarged detail fragmentary view on the line 8—8, Fig. 7, particularly illustrating the tracks on the transverse beam for supporting a welding head and for mounting the rear end of the longitudinal beam.

Fixed to the rear end of the beam 41 is a cross plate 85 having Z-shaped flanges 86—87 on its upper and lower edges for engaging rails 88—89 bolted to the upper and lower flanges of the inner channel 70, as best illustrated in Fig. 8, whereby the end of the beam is securely anchored in sliding engagement therewith. The forward end of the longitudinal beam is suspended from the cross beam 66 by an angle bar 90 having its lower end attached to the beam and its upper end secured to a plate 91 similar to the plate 85 at the opposite end of the beam. The plate 91 is also provided with Z-shaped flanges 92—93 on its upper and lower edges for engaging over rails 94—95 bolted to the flanges of the channel forming the beam 66.

Figure 5:
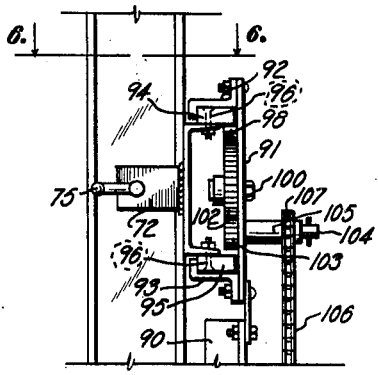
Fig. 5 is a detail elevational view illustrating supporting mechanism for the forward end of the longitudinal beam carrying welding heads.
Figure 6:
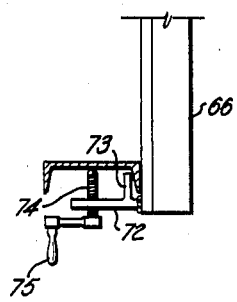
Fig. 6 is a sectional view on the line 6—6, Fig. 5.

The rails 88—89 and 94—95 preferably comprise rectangular bars extending longitudinally of their mounting flanges and secured thereto by bolts 96 extending therethrough and through the flanges, as best illustrated in Figs. 5 and 8. In order to move the longitudinal beam laterally with reference to its supporting beams, the lower faces of the rails 88—94 are provided with rack bars 97—98, respectively, and fixed to the respective plates 85—91 are studs 99—100 mounting idler gears 101—102.

Meshing with the gear 102 is a drive pinion 103 supported on a stub shaft 104 rotatably mounted in a bearing 105 carried by the plate 91. The stub shaft is driven by a chain 106 running over a sprocket 107 keyed in driving relation with the pinion 103 and over a sprocket 108 fixed to a rotatable actuating shaft 109 extending longitudinally of the beam 41, as best illustrated in Figs. 8, 9 and 10, and which is rotatably mounted at one end in the plate 85 and its opposite end in bearings 110 supported from the web of the beam 41. Fixed to the rear end of the shaft on the inner side of the plate 85 is a pinion 111 meshing with the gear 101 previously described.

The shaft 109 is provided at suitable intervals with hand wheels 112 whereby the shaft may be rotated to actuate the pinion 111 and the sprocket 108 to drive the gears 101 and 102 to draw the beam 41 along the rails in positioning the welding head carried thereby, as later described.

Also supported by the beams 40 and 66 is a catwalk 113 having its rear end fixed to a plate 114 slidable on the rails 88—89 similar to the plate 85 previously described, and its opposite end suspended by straps 115 supported from a plate 116 slidably mounted on the rails 94—95 carried by the beam 66. A similar catwalk 113' may also be supported parallel with the beam 40 by arms 117 projecting therefrom.

If desired, the catwalk 113 may also be adjusted by suitable gearing similar to the adjusting mechanism of the longitudinal beam. However, in the form illustrated, the catwalk may be readily slid along its respective rails by the workman operating the welding heads.

The welding heads 38—39 are adjustably mounted longitudinally of the channels supporting them and are mounted on carriages now described. These carriages include face plates 118 similar to the plates 85—91, and are provided on their rear faces with hook-shaped flanges 119—120 to engage tracks 121 on the channel 69 in the case of the welding head 39, and on tracks 122 on the channel 41 in the case of the welding head 38.

Formed on the lower projecting face of the upper rails 121 and 122 are rack bars 123 having teeth meshing with pinions 124 fixed to actuating shafts 125 rotatably mounted in the respective face plates 118 and operated by hand wheels 126. Thus it is apparent that when the hand wheels 126 are rotated the welding heads may be moved longitudinally of the rails to position their electrodes relatively to the seams of the tank. Additional welding heads 127 of similar construction may also be mounted on the respective beams, if desired.

In order that the gantry may be moved automatically along the tracks 4—5 to feed the welding heads longitudinally of the seams when performing the weld, I provide a driving mechanism, generally designated 129. This mechanism is carried on a platform 130 supported by the super-structure of the gantry above the leg 18, and includes a high speed motor 131 having a drive pinion 132 meshing with a gear 133 on a counter-shaft 134 extending longitudinally of the channel 29 and having its ends rotatably mounted adjacent the gear 133 in spaced plates 135—136 and its opposite end in bearings 137—138, as best illustrated in Fig. 3.

Fixed on the ends of the shaft 134 are pinions 139—140 meshing with the bevel gears 141—142, respectively. The gears 141—142 are carried on the ends of shafts 143—144 extending vertically of the legs 18—16, respectively, and carrying bevel pinions 145—145' on their lower ends. These pinions mesh with bevel gears 146—146' fixed to the inner side faces of the flanged wheels 12 previously described. Thus it is apparent that operation of the motor 131 drives the counter-shaft 134 through the gears 132—133 to actuate the pinions 139—140, driving the gears 141—142, to operate the vertical shafts 143—144 and actuate the pinions 145—146 rotating the bevel gears on the flange wheels carrying the rear ends of the gantry trucks, to move the gantry longitudinally over the work piece for bringing the welding heads into welding position.

Figure 3:
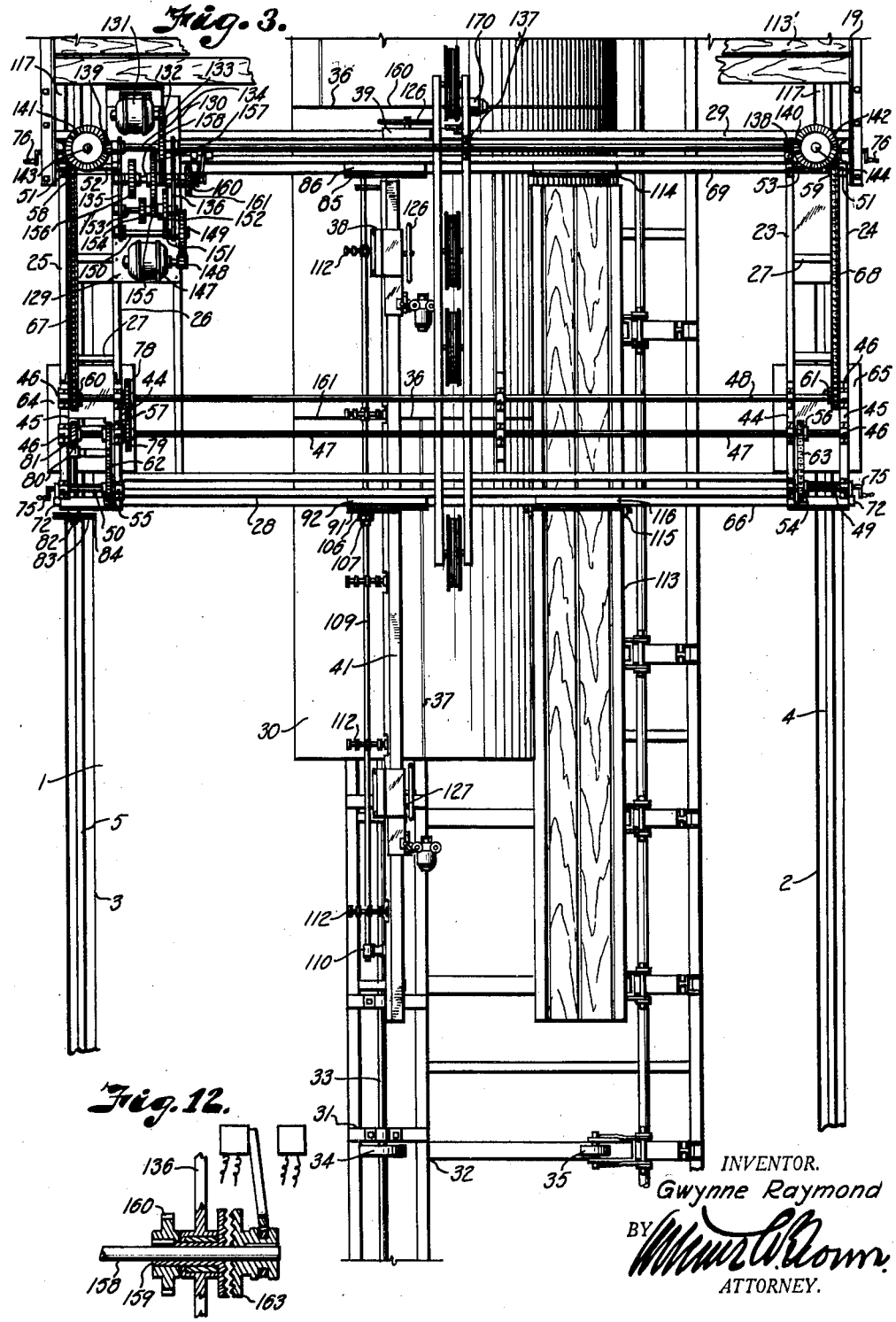
Fig. 3 is a plan view of the gantry.
Figure 4:
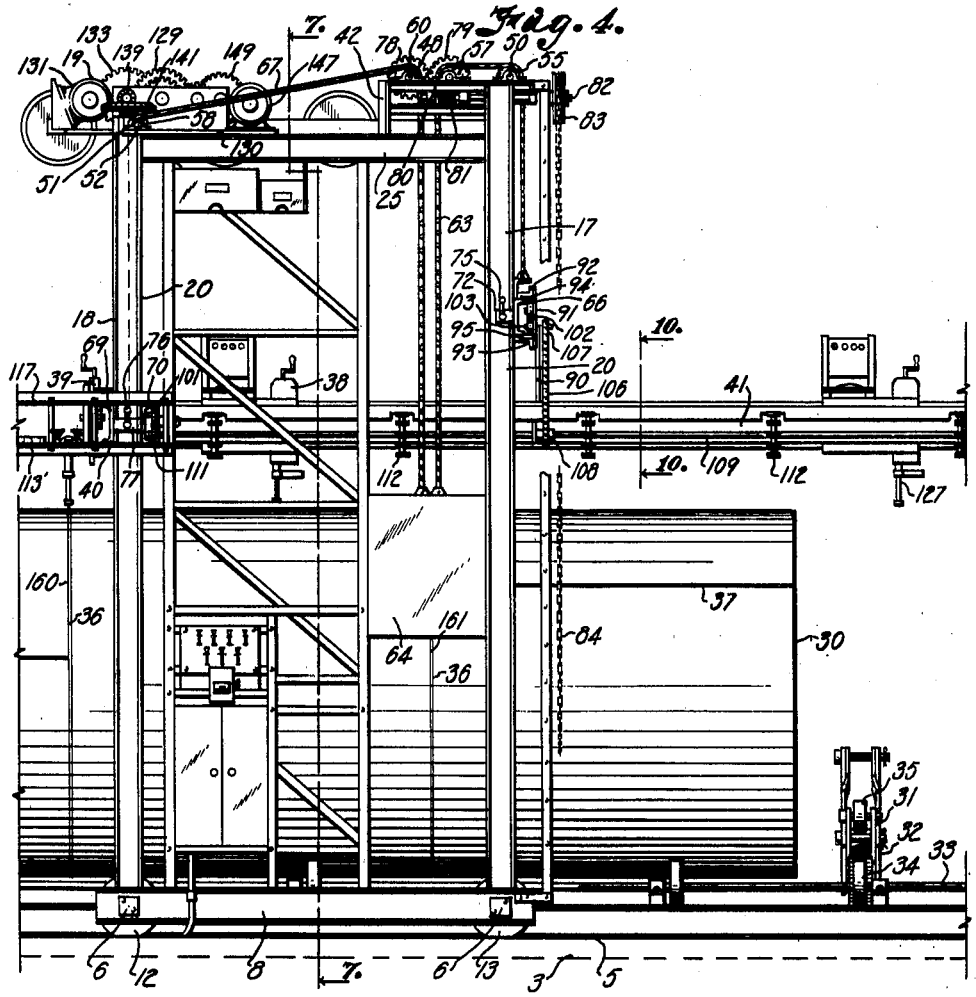
Fig. 4 is a side elevational view illustrating welding of a roundabout seam of a tank.

In order that the gantry may be moved at slower speeds to move the welding heads at the required welding rate, I provide a variable speed motor 147 on the platform and having a pinion 148 meshing with a gear 149 fixed to a counter-shaft 150 rotatably mounted in the plates 135—136 (Fig. 3).

Fixed on the shaft 150 is a pinion 151 driving a gear 152 that is rotatably mounted on a shaft 153 also carried by the plates 135—136 in parallel relation with the shaft 150. Slidably keyed on the shaft 153 in driving relation with the gear 152 are pinions 154—155 adapted to mesh with gears 156 or 157 on the shaft 158 in the same manner as and ordinary selective speed transmission. The shaft 158 is also rotatably mounted in the side plates, and rotatably mounted therein is a sleeve 159 carrying a drive pinion 160 meshing with the gear 133 actuating the shaft 134.

The sleeve 159 is adapted to be driven by the shaft 158 through an automatically operated clutch 161 which is engaged when the motor 147 is energized, but when the motor 131 is energized the clutch is automatically disengaged, the clutch being operable by suitable solenoids in the respective motor circuits.

The welding head 39 is equipped with a suitable motor 162 whereby it may be automatically moved along its beam at proper welding speeds by a chain drive to the shaft of the hand wheel previously described.

Figure 7:
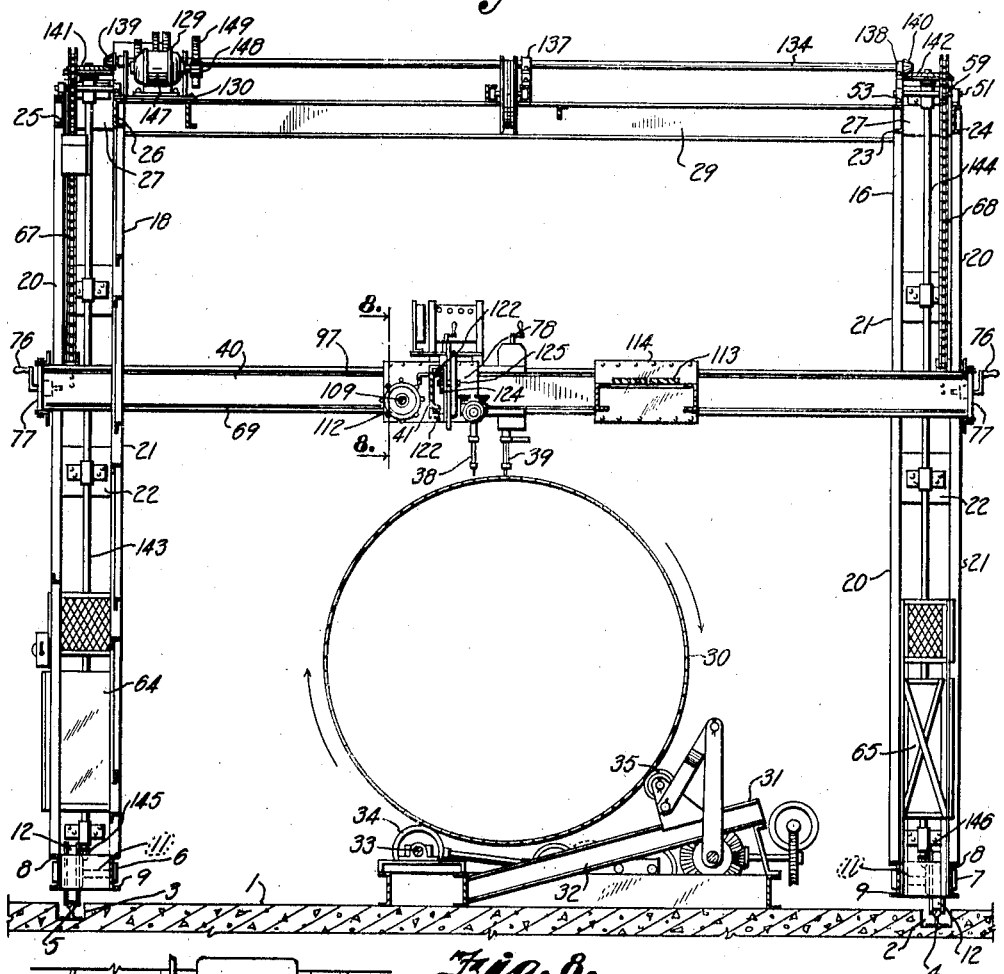
Fig. 7 is an end elevational view of the gantry.

In operating a gantry constructed and assembled as described and assuming that a tank is to be welded having both circumferential and longitudinal seams, the tank is mounted on the trunnion rollers, as illustrated in Fig. 7. The gantry is then moved into welding position over the tank by operating the high speed motor 131, the transmission clutch 163 for the low speed gears being disengaged upon energizing of the motor. For example, in welding the roundabout seams, the gantry will be moved until the electrode of the welding head aligns with the seam 164. The welding head on the beam 41 is then moved by operating its hand wheel until its electrode aligns with the adjacent seam 165.

If desired, the third welding head 127 may be adjusted on the end of the beam 41 exactly in the same manner as the welding head 38, to weld a third seam. The beam 41 is then moved laterally of the tank on its supporting tracks, to bring the electrodes into starting position where the seams are to commence by operating the actuating shaft 109, after which the chain 84 is manipulated to lower the electrodes of the welding heads into engagement with the respective seams. The trunnion shaft 33 is then actuated to rotate the tank 30 for progressively moving the seams past the electrodes of the welding heads as the seams are welded.

In welding longitudinal seams, the welding heads are moved by their hand wheels 126 until the electrode aligns with a longitudinal seam. The motor 131 will then be energized to bring the electrode into starting position with reference to the seams. When the electrode is in approximate position, the motor 131 will be de-energized and the motor 147 energized to actuate the shaft 134, shafts 143 and 144, and truck wheels 12, to move the gantry at welding speeds longitudinally of the tank.

In welding interior seams the gantry is moved away from the tank and the beams are lowered until the longitudinal beam is in position to enter the end of the tank, after which the gantry is moved to project the beam into the end thereof.

If longitudinal seams are to be welded the low speed motor is operated to cause the gantry to travel slowly toward the tank carrying the welding head progressively along the seam.

If the roundabout seams are to be welded, the welding heads may be adjusted on the beam to align with the roundabout seams, after which the tank is rotated to carry the seams across the electrodes to produce a continuous weld similar to welding of the exterior seams, as previously described.

It is obvious that flat objects having continuous seams may be as readily welded as curved objects, and that the welding heads are easily and quickly adjusted to both longitudinal as well as transverse seams.

While I have described the apparatus as particularly adapted for welding tanks, it is obvious that the gantry frame can straddle or span a box, bulkhead, building columns, and girders or the like which requires the welding of longitudinal seams.

Seams on flat objects may be automatically welded transversely by using the motor 162 associated with the welding head 39, and the longitudinal seams may be welded by moving the gantry.

At times it is desirable to operate two welding heads close together, so that the second welding head will be deposited before the heat from the first head has been dissipated. Transverse welding may be accomplished by positioning the heads 38 and 39 in close relation, either longitudinally or laterally, and positioning their electrode wires at such an angle that the electrodes will be positioned adjacent each other in either longitudinal or lateral relation for simultaneously welding two beads on a longitudinal seam or two juxtaposed beads on a roundabout seam.

The various adjustments for adapting the welding heads to the particular work in hand is clearly illustrated in Fig. 11. All of the welding heads may be moved over and away from the work by moving the gantry, which movement is indicated by the arrows 166. All of the heads are vertically movable to and from the work, as indicated by the arrows 167. The welding heads 38 and 39 are movable laterally of the work as indicated by the arrows 168 and 169, respectively, while the head 38 is also movable longitudinally of the work independent of the movement of the gantry, as indicated by the arrows 170. Besides these adjustments of the welding heads, the work may be rotated in either direction, as indicated by the arrows 171.

It is thus apparent that the machine is readily adapted and adjusted for automatic welding of all of the various seams encountered in continuous welding.

What I claim and desire to secure by Letters Patent is:

1. A welding apparatus of the character described, a gantry, a beam movable vertically on the gantry, a welding head movable on the beam, means for moving the gantry to bring the welding head into welding position, means for moving the gantry at welding speeds, a second vertically movable beam on the gantry and movable relative to the first beam, and a welding head on the second beam movable at right angles to the first named welding head.

2. A welding apparatus of the character described, a gantry, welding heads carried by the gantry, means for moving the gantry to bring the welding heads into welding position, means for simultaneously raising and lowering the welding heads on the gantry, and means on the gantry for moving one of the welding heads in one horizontal direction on the gantry, and means for independently moving the other welding head in a horizontal direction at an angle to the horizontal direction of the first welding head.

3. A welding apparatus of the character described, a support, welding heads carried by the support, means for simultaneously moving the welding heads vertically of the support, means for independently moving the welding heads horizontally of the support, means for moving the support at welding speed, and means for moving one of the heads at welding speed on the support in the direction of the movement of the support.

4. A welding apparatus of the character described, a work support, a gantry movable over the work support, a welding head carried by the gantry, means for moving the gantry to bring the welding head into welding position, and means for independently moving the welding head in the same direction as the movement of the gantry.

5. A welding apparatus of the character described, a work support, a gantry movable over the work support, a welding head carried by the gantry, means for moving the gantry at high speed to bring the welding head into welding position, means for moving the gantry at welding speeds, means carried by the gantry for raising and lowering the welding head relative to the work support, and means for independently moving the welding head in the same direction as the movement of the gantry.

6. A welding apparatus of the character described, a work support, a gantry movable over the work support, a welding head carried by the gantry, means for moving the gantry at high speed to bring the welding head into welding position, means for moving the gantry at welding speeds, means carried by the gantry for moving the welding head at an angle relative to movement of the gantry, and means for independently moving the welding head in the same direction as the movement of the gantry.

7. In an apparatus of the character described, spaced parallel tracks, a work support positioned between the tracks, trucks movable on the tracks, a gantry supported by the trucks, means for actuating the trucks to move the gantry longitudinally with reference to the work support, a beam vertically movable on the gantry to and from the work support, a welding head movable on the beam laterally of the work support, a second beam, means for supporting the second beam for movement at right angles relatively to the first beam, and a welding head adjustably mounted on said last named beam.

8. In an apparatus of the character described, spaced parallel tracks, a work support positioned between the tracks, trucks movable on the tracks, a gantry supported by the trucks, means for actuating the trucks to move the gantry longitudinally with reference to the work support, a beam vertically movable on the gantry to and from the work support, a welding head movable on the beam laterally of the work support, a second beam, means for supporting the second beam for movement at right angles relatively to the first beam, a welding head adjustably mounted on said last named beam, and means for counter-balancing said beams including said welding heads.

9. In a welding apparatus, a support, a beam movable vertically of the support, a welding head carried by the beam, means for moving the welding head longitudinally on the beam, a second beam on the support and extending at right angles to said first beam, means for moving the last named beam laterally of the first named beam, and a welding head carried by said last named beam.

10. In a welding apparatus, a support, a beam movable vertically of the support, a welding head carried by the beam, means for moving the welding head longitudinally on the beam, a second beam on the support and extending at right angles to said first beam, means for moving the last named beam laterally of the first named beam, a welding head carried by said last named beam, and means for moving the welding heads longitudinally of said beams.

11. In a welding apparatus, a support, a beam movable vertically of the support, a welding head carried by the beam, means for moving the welding head longitudinally on the beam, a second beam on the support and extending at right angles to said first beam, means for moving the last named beam laterally of the first named beam, a welding head carried by said last named beam, trucks carrying said support, and means on the support for operating said trucks to transport said support.

12. In a welding apparatus, a support, a pair of beams, means for mounting one of the beams for movement on the support in one direction, means for mounting the other beam on the support for movement in a direction transversely to the first named beam, rails on said beams, welding heads mounted on said rails, racks extending longitudinally of said rails, gears on the welding heads and meshing with the racks, and means for rotating said gears to move the welding heads on said rails.

13. In a welding apparatus, a support, a pair of beams, means for mounting one of the beams for movement on the support in one direction, means for mounting the other beam on the support for movement in a direction transversely to the first named beam, rails on said beams, welding heads mounted on said rails, racks extending longitudinally of said rails, gears on the welding heads and meshing with the racks, means for rotating said gears to move the welding heads on said rails, and means on the support for raising and lowering said beams.

14. A welding apparatus of the character described, a work support, a gantry movable over the work support, a welding head carried by the gantry, means for moving the gantry to bring the welding head into welding position, means carried by the gantry for moving the welding head at an angle relatively to movement of the gantry, and means for independently moving the welding head in the same direction as the movement of the gantry.

In testimony whereof I affix my signature.
GWYNNE RAYMOND.